(12) United States Patent
Keely et al.

(10) Patent No.: US 7,460,111 B2
(45) Date of Patent: Dec. 2, 2008

(54) COMPUTER INPUT DEVICE

(75) Inventors: Leroy B. Keely, Portola Valley, CA (US); Matthew R. Lerner, Seattle, WA (US); John Stoddard, Ben Lomond, CA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 11/068,849

(22) Filed: Mar. 2, 2005

(65) Prior Publication Data

US 2006/0197754 A1 Sep. 7, 2006

(51) Int. Cl.
*G09G 5/00* (2006.01)

(52) U.S. Cl. ............... 345/179; 345/156; D19/55; 178/18.01

(58) Field of Classification Search ........... 345/156–60, 345/162–166, 169, 173–182; 178/18.01–20.01; D19/35, 47, 49, 55, 57
See application file for complete search history.

(56) References Cited

U.S. PATENT DOCUMENTS

| | | | | |
|---|---|---|---|---|
| 5,945,981 A * | 8/1999 | Paull et al. ............... 345/180 |
| 6,176,564 B1 * | 1/2001 | Katayama ............... 347/23 |
| 6,550,997 B1 * | 4/2003 | King et al. ............... 401/45 |
| 6,681,333 B1 * | 1/2004 | Cho ............... 713/300 |
| D507,301 S * | 7/2005 | Qiu ............... D19/51 |
| D562,890 S * | 2/2008 | Wang et al. ............... D19/46 |
| 2002/0140684 A1* | 10/2002 | Lin et al. ............... 345/179 |
| 2003/0221876 A1* | 12/2003 | Doczy et al. ............... 178/18.01 |
| 2004/0054374 A1* | 3/2004 | Weber et al. ............... 606/107 |
| 2005/0024346 A1* | 2/2005 | Dupraz et al. ............... 345/179 |

* cited by examiner

*Primary Examiner*—Richard Hjerpe
*Assistant Examiner*—Mansour M Said
(74) *Attorney, Agent, or Firm*—Amin, Turocy & Calvin, LLP

(57) ABSTRACT

An input device is provided that has tactile features for assisting a user with locating an actuator and/or that has features for avoiding inadvertent actuation of an actuator. The input device may include a digital pen having an actuator disposed along a shaft of the pen at a location generally beyond the grip region, and/or an actuator recessed within an outer diameter of the pen shaft. The digital pen may include tactile features for indicating the actuator region of the pen within which the actuator is located. A method is also provided for identifying an actuator or actuator region of an input device.

15 Claims, 12 Drawing Sheets

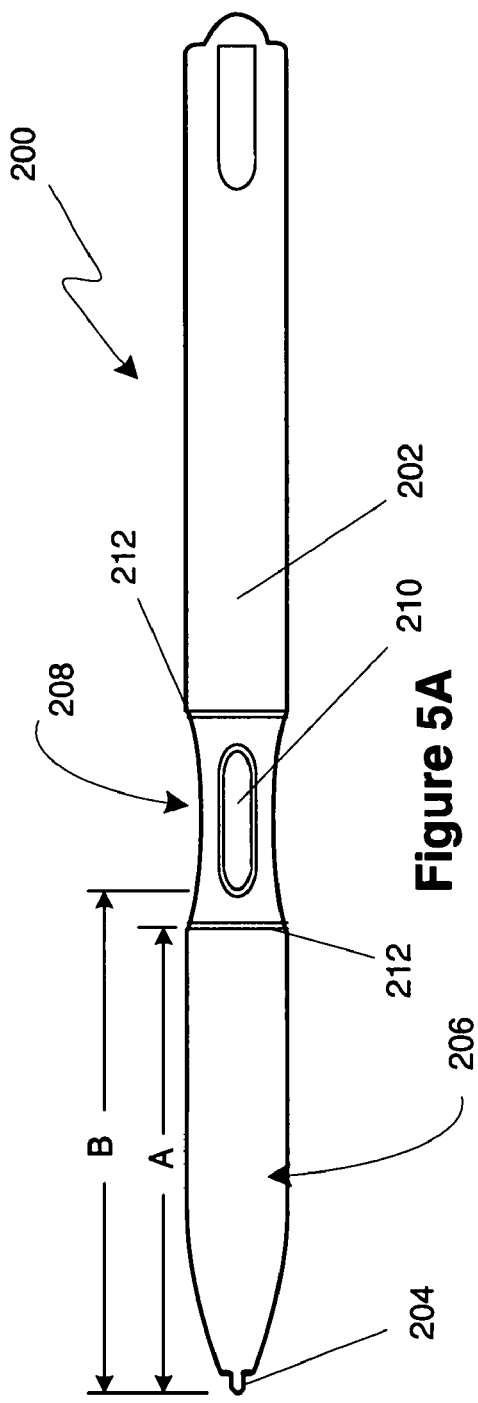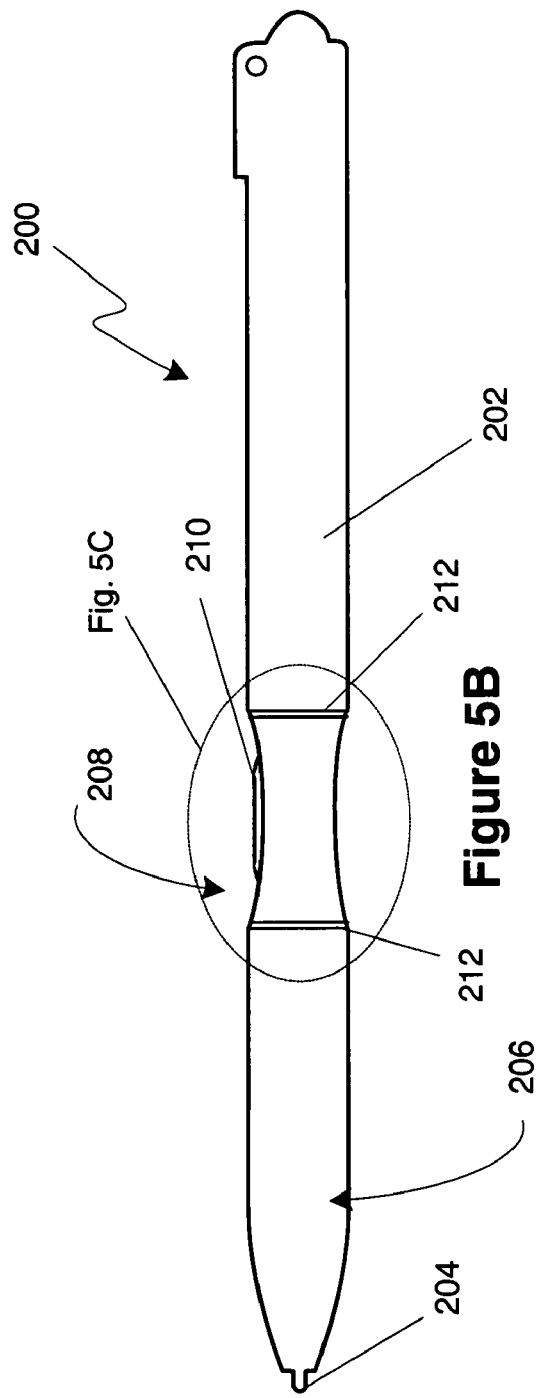

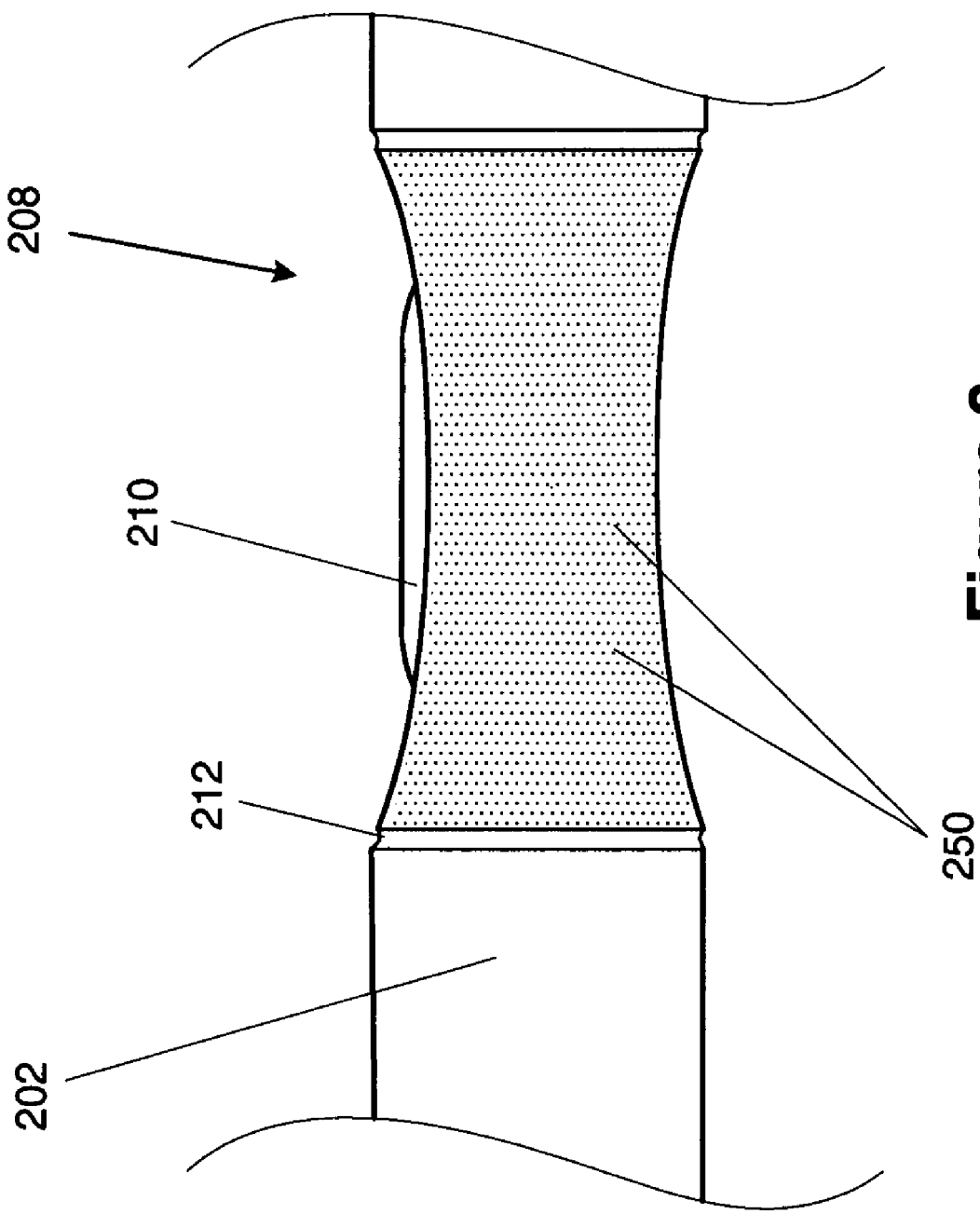

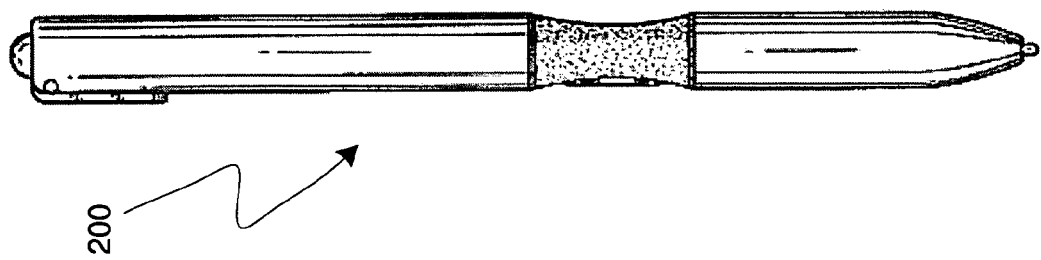
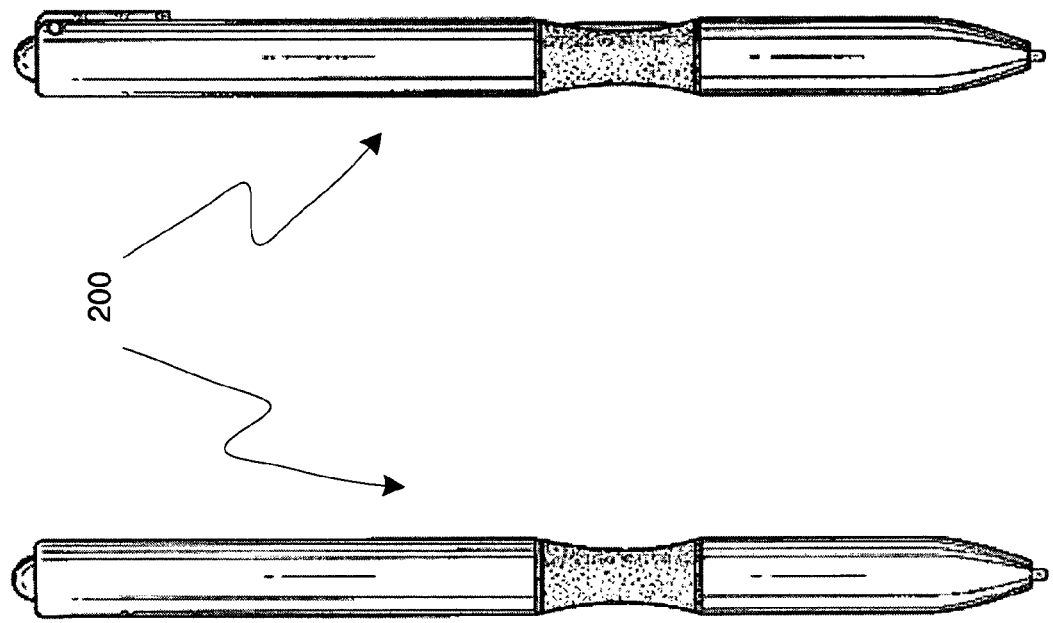
Figure 10D  Figure 10E  Figure 10F

COMPUTER INPUT DEVICE

BACKGROUND OF THE INVENTION

1. Field of the Invention

The present invention relates to input devices for interfacing with a computer. More specifically, the present invention relates to tactile, geometric and functional features of an input device. The invention has application to a variety of input devices, such as a digital pen or stylus, a mouse, etc.

2. Description of the Related Art

Various computer devices permit a user to write on a screen using an input device, such as a stylus or a digital pen. For instance, the Microsoft READER application permits a person to add electronic ink to a document in much the same way that a user would write with a standard pen and paper. Most hand-held computing devices, commonly known as Personal Digital Assistants (PDAs), also permit the user to write on the screen using a stylus input device.

As illustrated in FIG. 1, some of these conventional input devices include a button that provides expanded functionality, such as the right-click functionality provided by a conventional computer mouse. FIG. 1 shows a conventional digital pen 110 for use with a tablet PC that includes a button 112 disposed at a grip region 114 of the pen. The tip 116 of the pen causes digital ink to appear on the screen of the tablet PC when a user writes with it, whereas selection of the button typically causes a right-click menu to appear on the screen. In conventional digital pens, the button is located along the shaft 118 of the pen at about 10 mm to 25 mm from its tip within the gripping area for most users.

As shown, the button of conventional pens is disposed on the shaft such that it protrudes beyond the shaft. Users often inadvertently actuate the protruding button located in the grip when writing, gripping the pen or changing their grasp, which causes a right-click menu to appear or other functionality to occur. This can interrupt the user's workflow or provide unintended actions.

BRIEF SUMMARY

Aspects of the present invention address one or more of the issues mentioned above, thereby providing an input device having tactile features for locating an actuator and/or having features for avoiding inadvertent actuation of the actuator. Various aspects of the invention may include a pen having an actuator disposed along its shaft at a location generally beyond where users grip the pen, and/or an actuator recessed within an outer diameter of the pen shaft. Additional aspects of the invention may include tactile features for indicating an actuator region of a digital pen.

Further aspects include methods for identifying an actuator or an actuator region of an input device. These and other aspects are addressed in relation to the figures and related description.

BRIEF DESCRIPTION OF THE DRAWINGS

FIG. 5A is a first side view of the digital pen of FIG. 2.

FIG. 5B is a second side view of the digital pen of FIG. 2.

FIG. 6 is a close-up view of an actuator region of a digital pen according to another embodiment of the invention.

FIGS. 10A and 10D-F are additional side views of the digital pen of FIG. 2.

DETAILED DESCRIPTION

Figure 1:
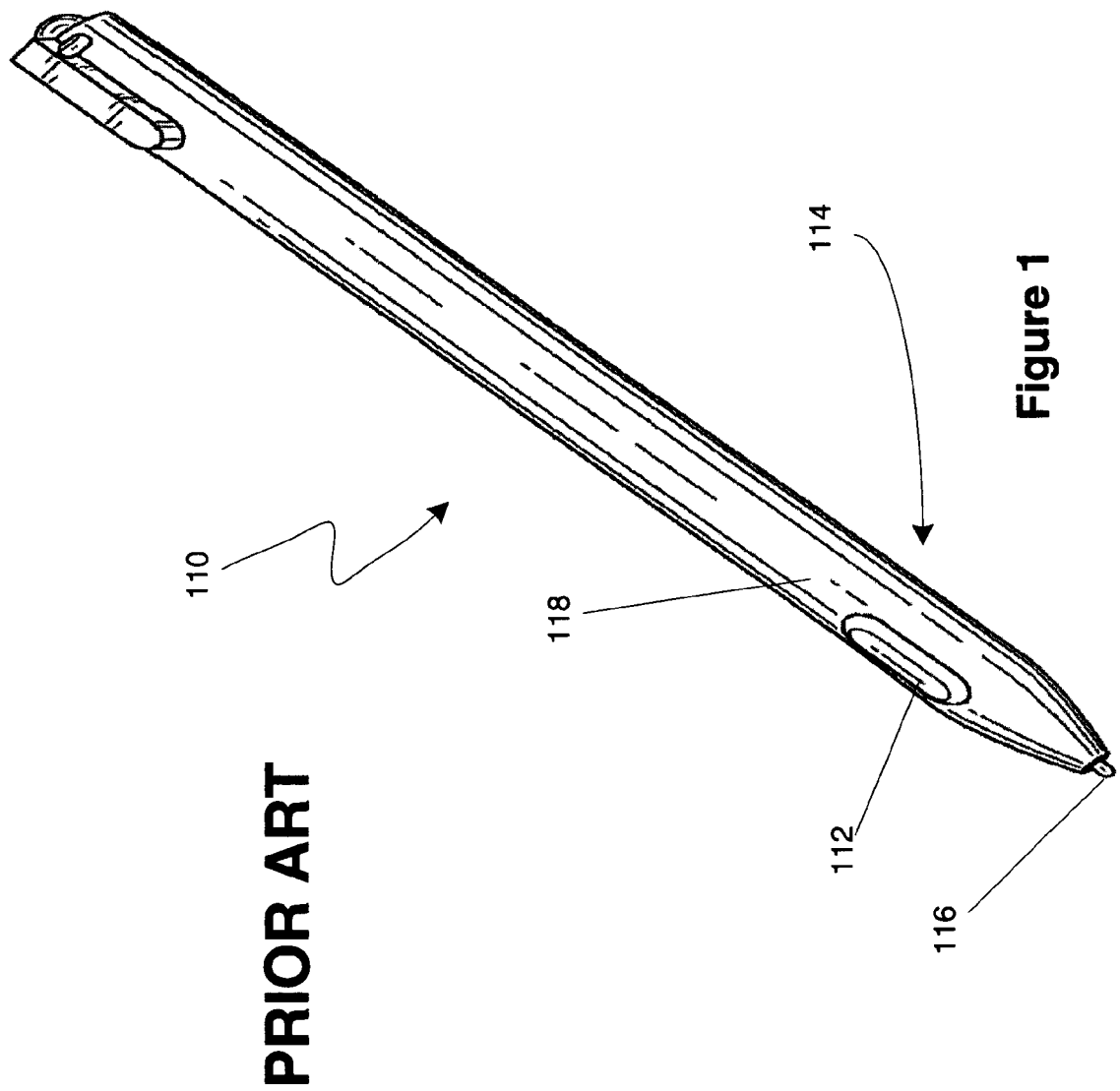
FIG. 1 shows a conventional digital pen.
Figure 2:
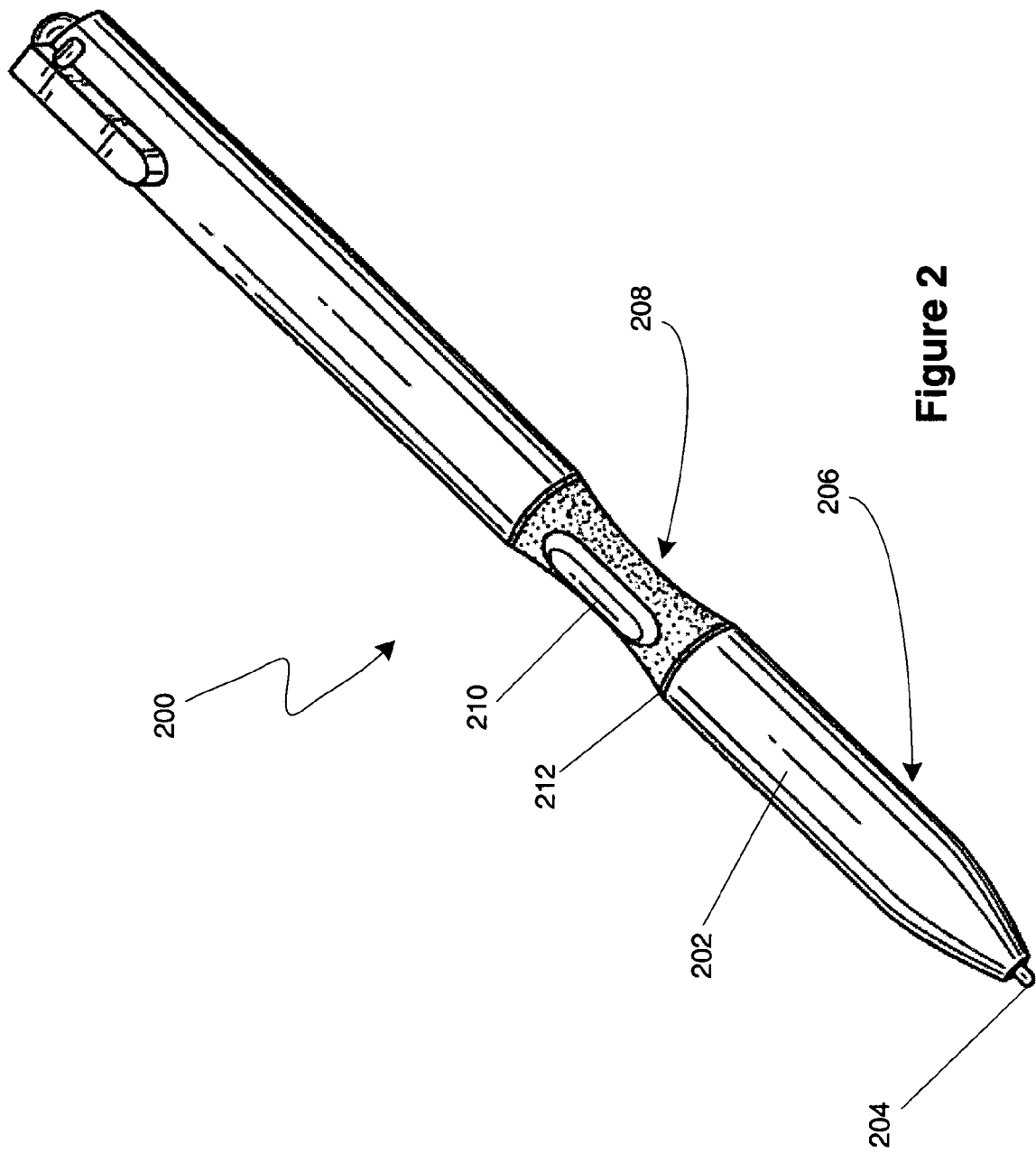
FIG. 2 shows a digital pen supporting one or more aspects of the invention.

FIGS. 2 and 5A-5C show a digital pen 200 that supports various aspects of the present invention. As shown in FIG. 2, digital pen 200 generally includes a shaft 202, a tip 204 at a longitudinal end of the shaft, a grip region 206 disposed along the shaft and located proximate to the tip, and an actuator region 208 disposed along the shaft. The actuator region is generally located further along the shaft than the grip region to reduce inadvertent user interaction with the actuator region. Located within the actuator region is an actuator that is shown herein as a button 210. Although shown as button 210, it is understood that various other actuators may be used, such as a touch pad, a wheel, or another user-selectable feature. A user of digital pen 200 can use the tip 204 to interact with a screen or another portion of a computing device. The user can actuate button 210 to generate a menu, select an object on the screen, or to perform another function depending on the configuration of the pen and the associated computer.

As shown, the actuator region may be dished or scalloped shaped, which provides a tactile guide to the button. Without looking at the pen to locate the button, a user can easily identify the dished actuator region via touch to locate the button and to follow the dish toward the button. In addition, placing the button within the waisted, reduced diameter region of the dish permits the button to protrude from its surroundings while being located within the outer diameter of the shaft. This further reduces inadvertent activation of the button when a user handles portions of the shaft by recessing it below the shaft diameter. However, protruding the button from its surroundings within the dished actuator region permits the user to sense it easily via touch.

A tactile boundary 212 preferably exists between the actuator region 208 and the grip region 206 to assist the user further with locating the actuator region and the button via touch. The tactile boundary may be a sharp edge, a bump, a groove or another feature that is easily felt. It may also be a feature that has a different texture than the shaft and/or the actuator region that a user can easily discern by touch, such as a rubbery ring disposed about a plastic pen shaft. These features and other features of digital pen 200 will be discussed further below in connection with FIGS. 5A-5C. In general, the features of digital pen 200 discussed herein improve usability of the pen while in a computing environment.

Figure 3:
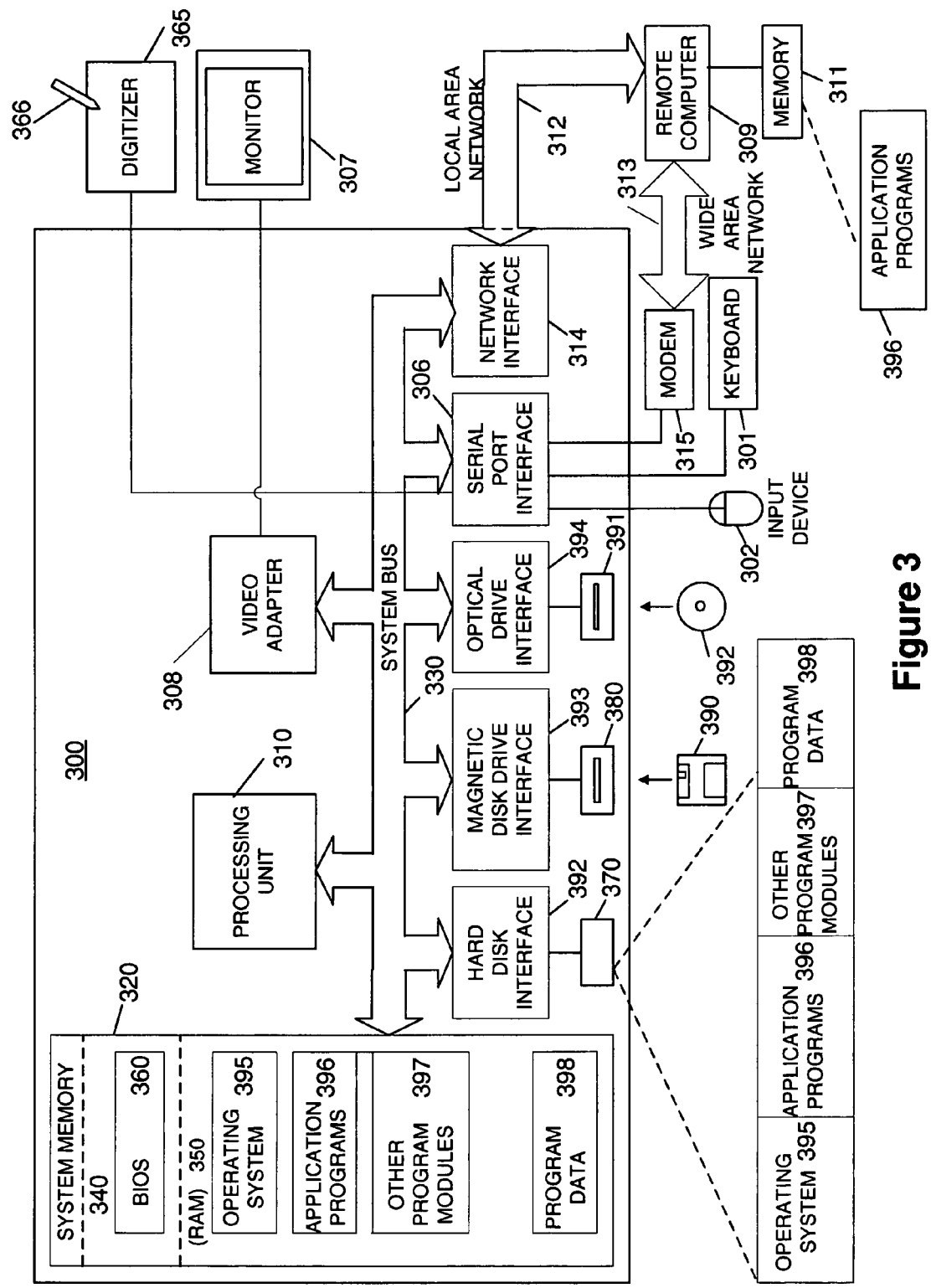
FIG. 3 shows a general-purpose computer interacting with the digital pen of FIG. 2 and supporting one or more aspects of the present invention.

FIG. 3 illustrates a schematic diagram of an illustrative conventional general-purpose digital computing environment that can be used to implement various aspects of the present invention. In FIG. 3, a computer 300 includes a processing unit 310, a system memory 320, and a system bus 330 that couples various system components including the system memory to the processing unit 310. The system bus 330 may be any of several types of bus structures including a memory bus or memory controller, a peripheral bus, and a local bus using any of a variety of bus architectures. The system memory 320 includes read only memory (ROM) 340 and random access memory (RAM) 350.

A basic input/output system 360 (BIOS), containing the basic routines that help to transfer information between elements within the computer 300, such as during start-up, is stored in the ROM 340. The computer 300 also includes a hard disk drive 370 for reading from and writing to a hard disk (not shown), a magnetic disk drive 380 for reading from or writing to a removable magnetic disk 390, and an optical disk drive 391 for reading from or writing to a removable optical disk 392 such as a CD ROM or other optical media. The hard disk drive 370, magnetic disk drive 380, and optical disk drive 391 are connected to the system bus 330 by a hard disk drive interface 392, a magnetic disk drive interface 393, and an optical disk drive interface 394, respectively. The drives and their associated computer-readable media provide nonvolatile storage of computer readable instructions, data structures, program modules and other data for the personal computer 300. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 370, magnetic disk 390, optical disk 392, ROM 340 or RAM 350, including an operating system 395, one or more application programs 396, other program modules 397, and program data 398. A user can enter commands and information into the computer 300 through input devices such as a keyboard 301 and pointing device or other input device 302. Other input devices (not shown) may include a directional input device, a microphone, a joystick, a game pad, a satellite dish, scanner or the like. These and other input devices are often connected to the processing unit 310 through a serial port interface 306 that is coupled to the system bus, but may be connected by other interfaces, such as a parallel port, game port or a universal serial bus (USB). Further still, these devices may be coupled directly to the system bus 330 via an appropriate interface (not shown). A monitor 307 or other type of display device is also connected to the system bus 330 via an interface, such as a video adapter 308. In addition to the monitor, personal computers typically include other peripheral output devices (not shown), such as speakers and printers.

In one embodiment, a pen digitizer 365 and accompanying digital pen or stylus 366 are provided in order to digitally capture freehand input, such as digital pen 200 shown in FIG. 2. Although a direct connection between the pen digitizer 365 and the serial port interface 306 is shown, in practice, the pen digitizer 365 may be coupled to the processing unit 310 directly, or via a parallel port or another interface to the system bus 330 by any technique including wirelessly. Also, the pen 366 may have a camera associated with it and a transceiver for wirelessly transmitting image information captured by the camera to an interface interacting with bus 330. Further, the pen may have other sensing systems in addition to or in place of the camera for determining strokes of electronic ink including accelerometers, magnetometers, and gyroscopes.

Furthermore, although the digitizer 365 is shown apart from the monitor 307, the usable input area of the digitizer 365 may be co-extensive with the display area of the monitor 307. Further still, the digitizer 365 may be integrated in the monitor 307, or may exist as a separate device overlaying or otherwise appended to the monitor 307.

The computer 300 can operate in a networked environment using logical connections to one or more remote computers, such as a remote computer 309. The remote computer 309 can be a server, a router, a network PC, a peer device or other common network node, and typically includes many or all of the elements described above relative to the computer 300, although only a memory storage device 311 has been illustrated in FIG. 3. The logical connections depicted in FIG. 3 include a local area network (LAN) 312 and a wide area network (WAN) 313. Such networking environments are commonplace in offices, enterprise-wide computer networks, intranets and the Internet.

When used in a LAN networking environment, the computer 300 is connected to the local network 312 through a network interface or adapter 314. When used in a WAN networking environment, the personal computer 300 typically includes a modem 315 or other means for establishing a communications over the wide area network 313, such as the Internet. The modem 315, which may be internal or external, is connected to the system bus 330 via the serial port interface 306. In a networked environment, program modules depicted relative to the personal computer 300, or portions thereof, may be stored in the remote memory storage device. Further, the system may include wired and/or wireless capabilities. For example, network interface 314 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 4:
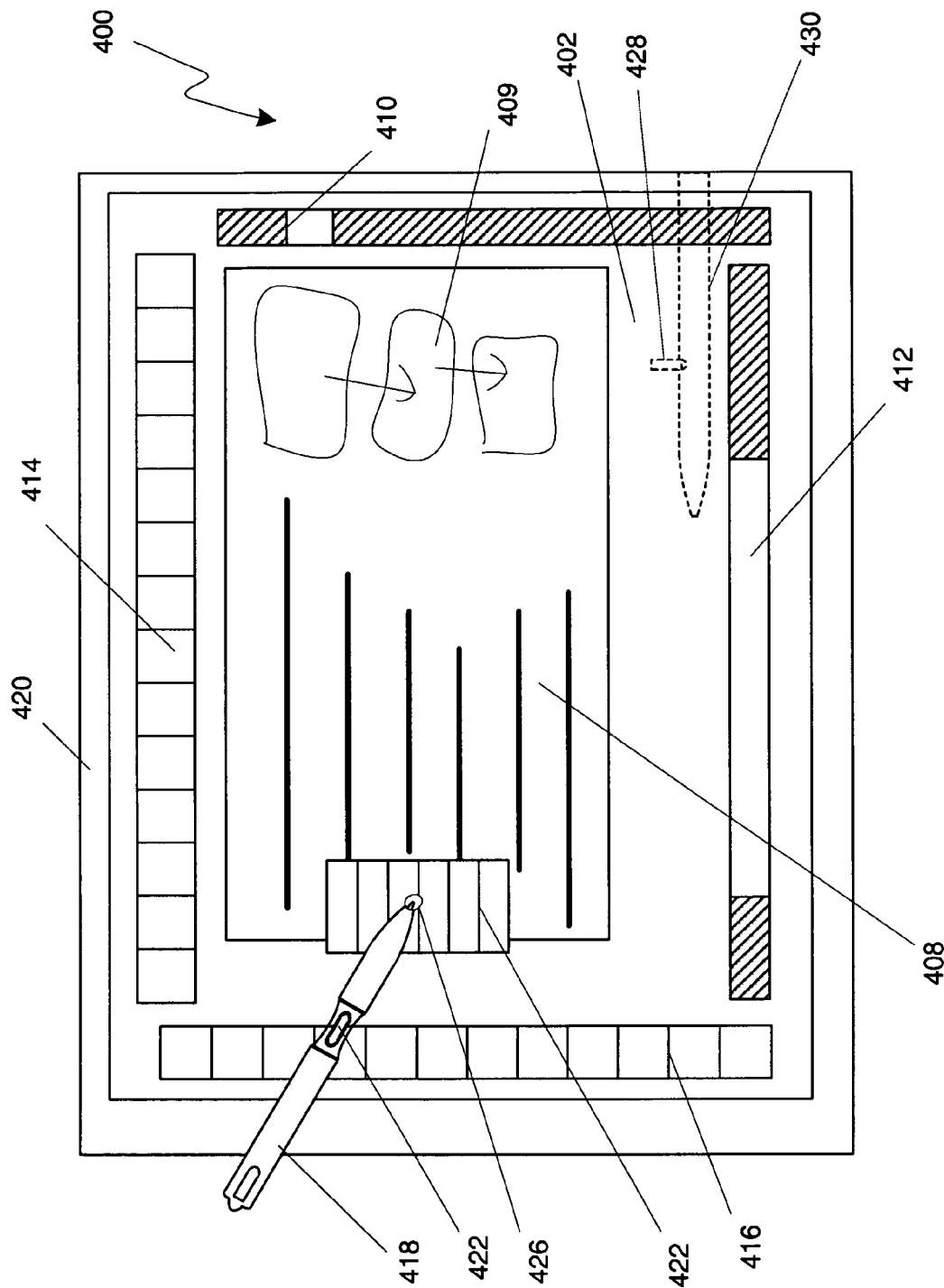
FIG. 4 is a top plan view of a stylus-based computer interacting with the digital pen of FIG. 2.

FIG. 4 illustrates an illustrative tablet PC 400 that can be used in accordance with various aspects of the present invention. Any or all of the features, subsystems, and functions in the system of FIG. 3 can be included in the computer of FIG. 4. Tablet PC 400 includes a housing 420 and a display surface 402, e.g., a digitizing flat panel display, preferably, a liquid crystal display (LCD) screen, on which a plurality of windows may be displayed. In the example shown in FIG. 4, a single window is shown displaying a textual document 408, a vertical scroll bar 410, a horizontal scroll bar 412, a header menu 414, and a toolbar 416. Textual document 408 is shown being displayed in a first orientation, such as portrait mode.

Using digital pen 418, a user can select, highlight, and/or write on the digitizing display surface 402. Examples of suitable digitizing display surfaces 402 include electromagnetic pen digitizers, such as MUTOH or WACOM pen digitizers. Other types of pen digitizers, e.g., optical digitizers, may also be used. Tablet PC 400 interprets gestures made using digital pen 418 in order to manipulate data, enter text, create drawings, and/or execute conventional computer application tasks such as spreadsheets, word processing programs, and the like. The digital pen 418 may be equipped with one or more actuators or other features to augment its selection capabilities. For example, user selection of button 422 may cause a menu 424, such as a right-click menu, to appear on the display screen.

In one embodiment, the digital pen 418 could be implemented as a "pencil" or "pen", in which one end constitutes a writing portion and the other end constitutes an "eraser" end, and which, when moved across the display, indicates portions of the display are to be erased. Region 426 shows a feedback region or contact region permitting the user to determine where the digital pen 418 has contacted the display surface 402. Additionally, a user's own finger could be the stylus 404 and used for selecting or indicating portions of the displayed image on a touch-sensitive or proximity-sensitive display. Consequently, the term "input device", as used herein, is intended to have a broad definition and encompasses many variations on well-known input devices such as digital pen 418.

Other types of input devices, such as a mouse, trackball, a scroll wheel, a fingerprint reader, a touch pad, a sweep sensor, or the like may also be used with tablet PC 400. One of more of these devices may be integrated with the tablet PC 400 and/or exist separately. In addition, tablet PC 400 may include built-in storage for storing a removable input device. In the example shown in FIG. 4, tablet PC 400 includes storage bay 428 for receiving and storing digital pen 418 when not in use. As further shown, the tablet PC includes a sensor 430 for sensing when the digital pen is stored within the storage bay. The sensor could include a variety of sensors, such as a discrete switch or a proximity sensor. In one configuration in which the digital pen is digital pen 200 of FIG. 2, sensor 430 could include a plunger switch or other sensor that senses actuator region 208 or tactile boundary 212 to recognize when the pen is fully stowed within the storage bay.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Figure 5C:
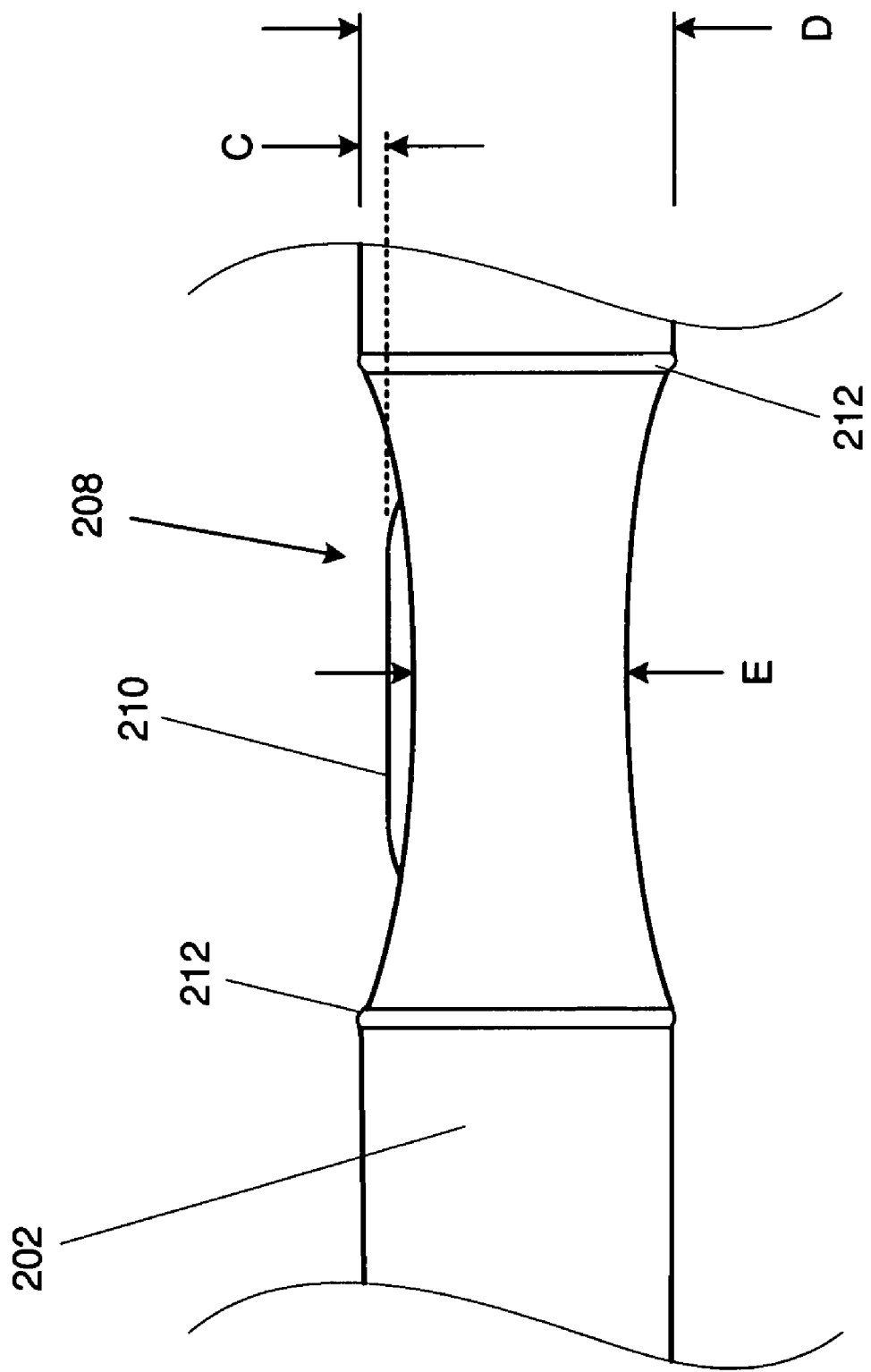
FIG. 5C is a close-up view of an actuator region of the digital pen of FIG. 2.

Referring now to FIGS. 5A-5C, various views of digital pen 200 of FIG. 2 are shown. As illustrated in FIG. 5A, button 210 is generally located beyond grip region 206 at a distance B from tip 204, and actuator region 208 is located at a distance A from the tip. As the grip region for most users extends up to about 30 mm from the pen tip, distance A is more than 30 mm and is preferably about 35 mm. Similarly, distance B is more than 30 mm and is preferably 35 mm to 45 mm from the tip. In one configuration, distance B is about 40 mm from the tip, which is safely outside of the grip area for most users to avoid inadvertent activation, while being easily within reach of a user's finger when writing with the pen.

FIG. 5B generally shows a side profile of button 210 in relation to the actuation region 208, and FIG. 5C shows a close-up view of the same. In the example shown in FIG. 5C, tactile boundary 212 is a bump protruding from shaft 202, which is preferably a relatively sharp protrusion for providing a feature that can easily be felt via a user's finger. As further shown in FIG. 5C, shaft 202 has an outer diameter D, which may generally be its maximum outer diameter, or it may be the outer diameter proximate the actuation region. Nonetheless, button 210 is recessed within diameter D at a distance C below the proximate surface of the shaft. This helps to prevent inadvertent actuation of the button from a user holding the pen along its shaft, and it assists the user with sensing the button as recessed feature.

As further shown in FIG. 5C, the actuation region 208 has a diameter E that is less than diameter D of the shaft and that is disposed below the top of the button. Thus, button 210 in effect protrudes from the actuation region 208 while remaining below the outer surface of the shaft. This assists the user with locating the button by touch and actuating it. Diameter E is preferably about 20% to 40% less than diameter D of the shaft, and is more preferably about 30% less than that of diameter D. Such a significant waisting of the shaft in the actuation region provides a clear tactile identification of the actuation region to the user and permits the button to protrude therefrom, while maintaining structural integrity through the actuation region. Although actuation region 208 is shown as a uniform feature about the circumference of the shaft, it is understood that as the actuation region may be a depression that does not extend around the circumference of the shaft. For instance, it may be a recess on one side of the shaft within which the button is disposed.

Tactile features for locating the actuation region may also include texturing or other tactile differences between the shaft, the actuation region, and/or the tactile boundary. As shown in FIG. 6, the surface of actuation region 208 may include various geometric features 250, such as dimples, bumps, etc. Further, the shaft may use a first surface material, such as a hard plastic, and the actuation region may use a second surface that provides a different tactile feel to the user, such as a rubberized surface. In addition, the tactile boundary 212 may provide yet another touch-discernable surface, such as a sharp edge or a groove. In the example of FIG. 6, tactile boundary 212 is shown as a pair of grooves within the shaft that bound the actuation region on opposite sides.

Figure 7:
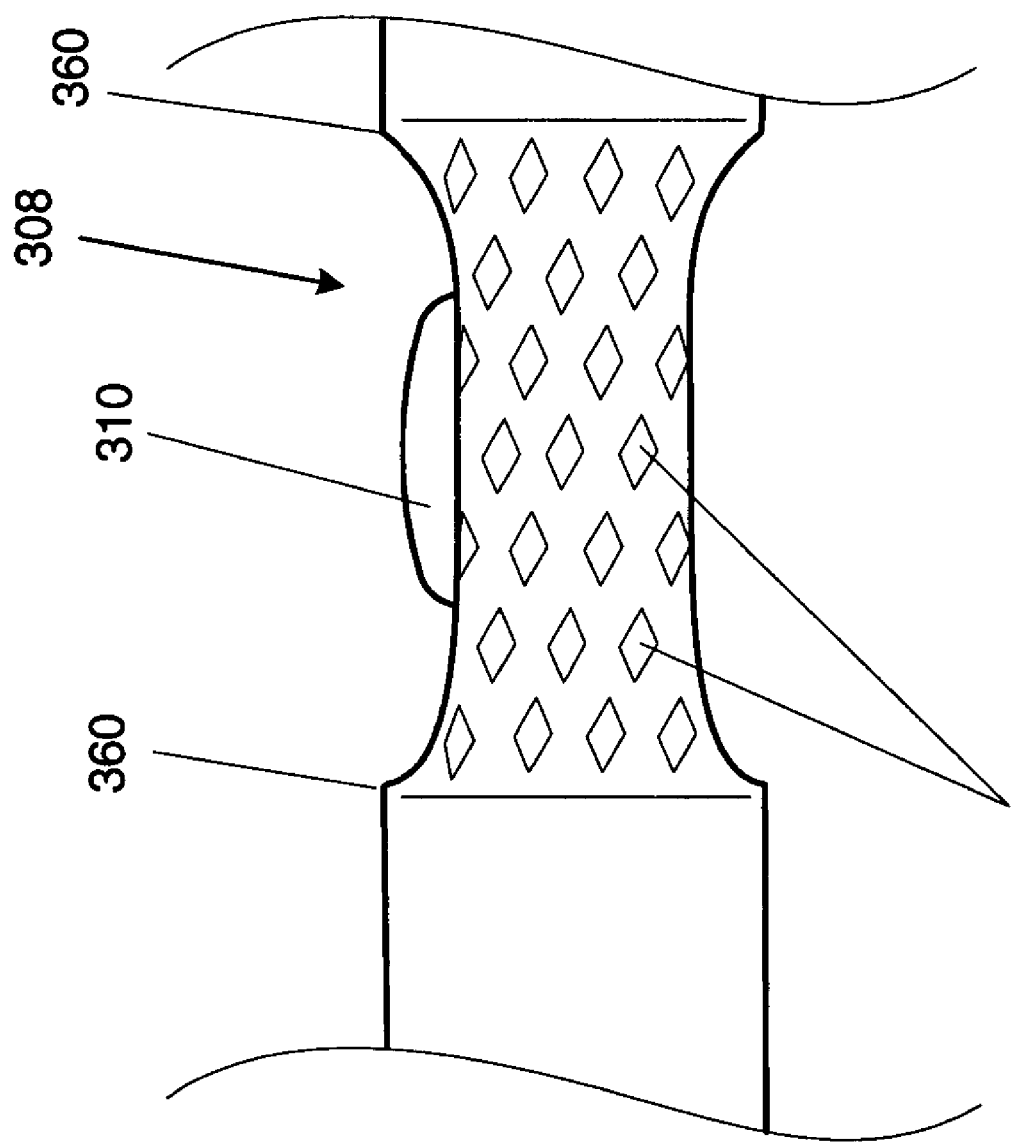
FIG. 7 is a close-up view of an actuator region of a digital pen according to a further embodiment of the invention.

FIG. 7 shows another example for actuation region 308, which includes sharp edges 360 at the boundaries of the actuation region that can be easily felt by the user. Actuation region 308 further includes geometric shapes 370 to provide a clear tactile indication of the actuation region to the user. It is understood that many varieties of actuation regions, tactile boundaries, and other tactile features may be provided to allow a user to locate an actuator easily on the input device by touch.

In the example of a digital pen, the tactile features permit a user to keep their fingers in the grip region while writing with the pen, and yet easily locate the actuator by touch when desired. For instance, the tactile features can permit the user to slide a finger, such as an index finger, up from the grip region to make contact with the actuator, and then back to the grip region as desired. This permits the user to grip the pen in a conventional manner proximate the tip while avoiding inadvertent actuation of the actuator, and permits the user to quickly locate and activate the actuator without looking at the pen. Many other tactile features are possible for digital pen configurations in which the actuator is disposed outside of the grip region. For instance, a groove or an arrow may be formed longitudinally in the pen shaft that extends from the grip region to the actuator region, which the user can follow with a finger to locate the actuator.

Figure 8:
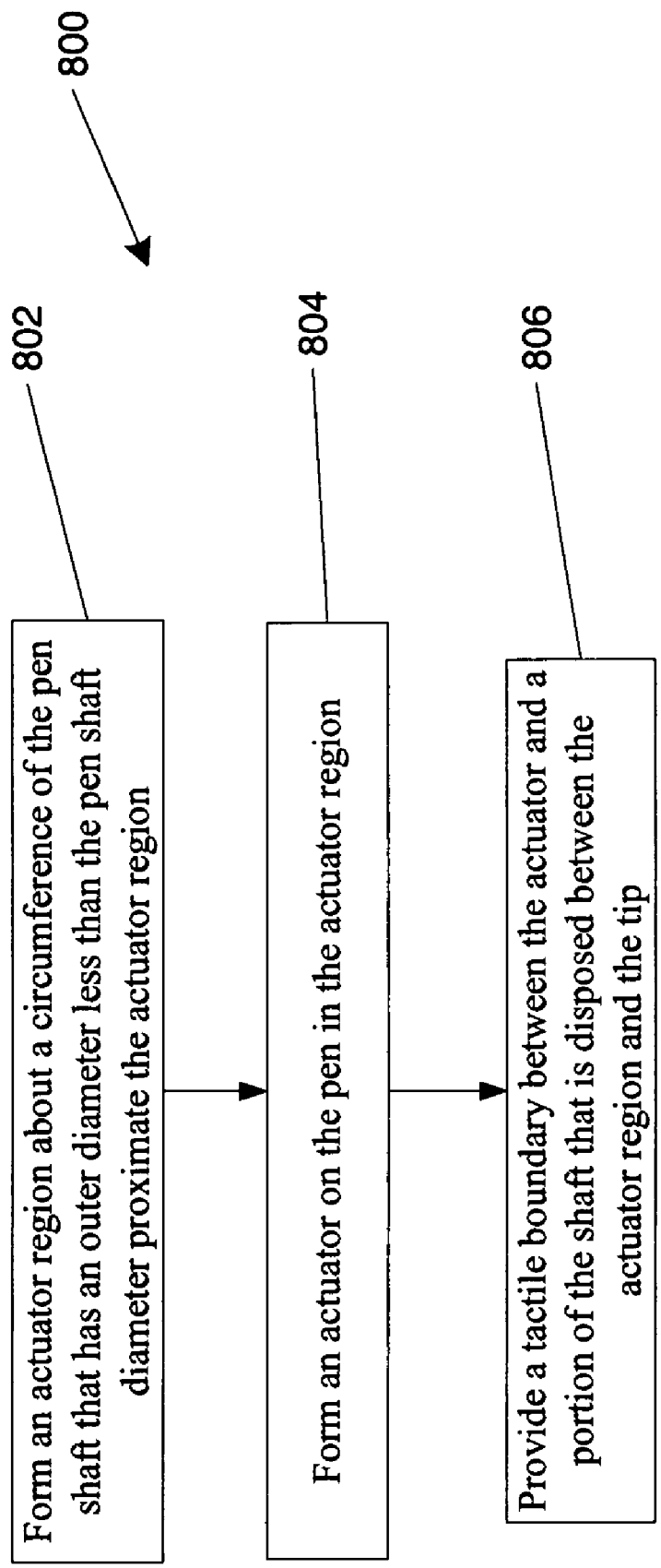
FIG. 8 shows a process for providing tactile identification of an actuator of a digital pen in accordance with aspects of the present invention.
Figure 9:
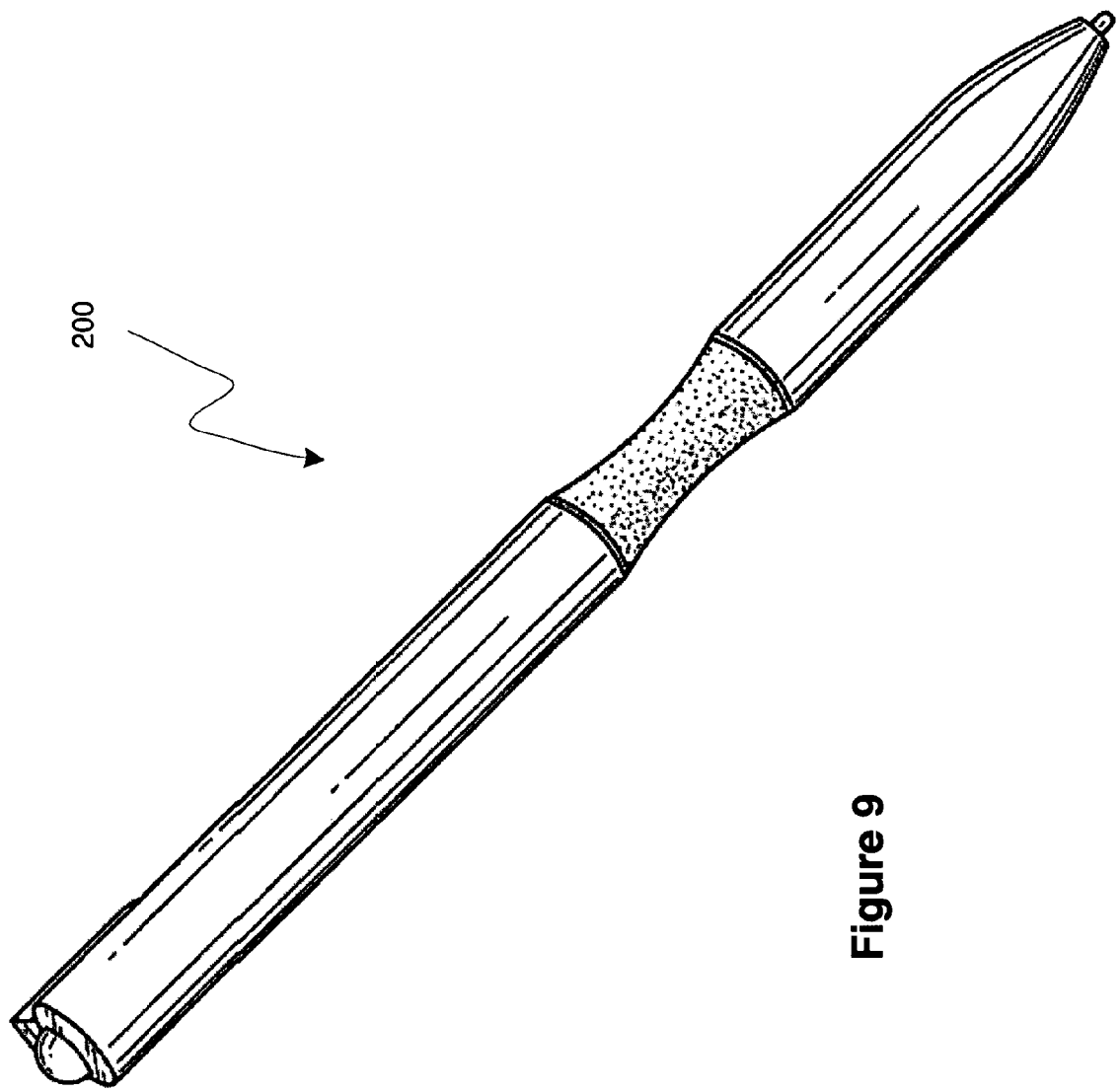
FIG. 9 is second perspective view of the digital pen of FIG. 2.
Figures 10B, 10C:
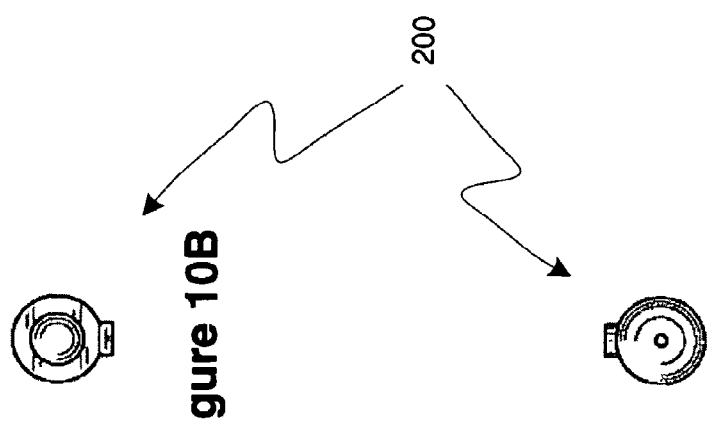
FIG. 10B is a first end view of the digital pen of FIG. 2.
FIG. 10C is a second end view of the digital pen of FIG. 2.
Figure 10A:
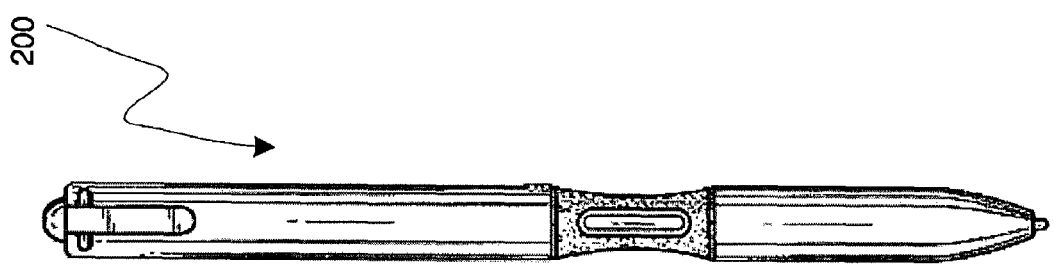

Referring now to FIG. 8, a method 800 is generally shown for providing tactile identification of an actuator of a digital pen. The method generally includes the step 802 of forming an actuator region about a circumference of the pen shaft that has an outer diameter less than the shaft diameter proximate the actuator region, and the step 804 of forming the actuator within the actuator region. In addition, the method includes the step 806 of providing a tactile boundary between the actuator and a portion of the shaft that is disposed between the actuator region and the tip. For step 804, the actuator may include a button projecting from the actuator region and that is disposed within the shaft outer diameter.

FIGS. 9 and 10A-F show additional views of digital pen 200. These views illustrate many of the features discussed above and provide further examples of a digital pen embodiment supporting many aspects of the invention.

Aspects of the present invention have been described in terms of illustrative embodiments thereof. Numerous other embodiments, modifications and variations within the scope and spirit of the appended claims will occur to persons of ordinary skill in the art from a review of this disclosure. In particular, it is understood that aspects of the invention may practiced with a large variety of computing devices, including personal computers, mobile devices, PDAs, and mobile terminals. Further, it is understood that aspects of the invention may be used with a large variety of input devices.

We claim:

1. A pen for a pen-enabled computing device, the pen comprising:
    a shaft;
    a tip at a longitudinal end of the shaft;
    a grip region proximate the tip;
    an actuator disposed along the shaft generally beyond the grip region, a proximate portion of the actuator closest to the tip located 35 mm to 45 mm from the tip;
    a recessed shaft region disposed about the actuator, the recessed shaft region having a diameter less than the grip region outer diameter;
    wherein the shaft has an outer diameter at the grip region and the actuator is recessed within the outer diameter, the actuator protrudes from the recessed shaft region while remaining below the outer surface of the shaft; and
    a tactile boundary between the grip region and the recessed shaft region, such that the recessed shaft region provides a different tactile feel to the user than the grip region.

2. The pen according to claim 1, wherein the recessed region is scallop shaped.

3. The pen according to claim 1, wherein the tactile boundary comprises a projection about a circumference of shaft.

4. The pen according to claim 1, wherein the tactile boundary comprises a groove about the circumference of the shaft.

5. The pen according to claim 1, wherein the grip region has a first texture and the recessed shaft region has a second texture.

6. The pen according to claim 1, wherein the actuator comprises a button.

7. The pen according to claim 1, wherein a proximate portion of the actuator closest to the tip is located about 40 mm from the tip.

8. A computing system comprising:
    a computing device comprising a touch sensitive screen; and
    a stylus-shaped input device providing user inputs to the computing device, the input device comprising:
    a shaft;
    a tip at a longitudinal end of the shaft;
    an actuator region disposed along the shaft and extending about a circumference of the shaft, the actuator region having an outer diameter less than an outer diameter of the shaft located proximate to the actuator region, wherein an actuator is recessed within the actuator region, the actuator protrudes from the recessed actuator region while remaining below an outer surface of the shaft; and
    a boundary feature at an interface between the actuator region and a portion of the shaft located between the tip and the actuator region, such that the actuator region provides a different tactile feel to the user than the shaft;
    wherein the stylus-shaped input device includes an actuator having a first end closest to the tip disposed at 35 mm to 45 mm from the tip; and
    a feedback region that permits a user to determine where the stylus-shaped input device has contacted the touch sensitive screen.

9. The computing system of claim 8, wherein the portion of the shaft between the boundary feature and the tip has a first texture and the actuator region has a second texture different from the first texture.

10. The computing system of claim 9, wherein the boundary feature has a third texture different from the first and second textures.

11. The computing system of claim 8, wherein the computing device further comprises:
    a stylus storage bay for receiving and storing the stylus therein; and
    a sensor for sensing one of the actuator region and the tactile boundary of the stylus when disposed within the storage bay in a storage position.

12. The computing system of claim 11, wherein the sensor senses the actuator region, and the sensor comprises a plunger switch.

13. The computing system of claim 8, wherein the boundary feature of the input device comprises one of a projection and an indentation.

14. The computing system of claim 8, wherein the actuator comprises a button.

15. A method for providing tactile identification of a button for a digital pen of a pen-enabled computing device, the digital pen having a shaft, an actuator button, and a tip at a first end thereof along a lower portion of the shaft, the method comprising:
    forming an actuator region about a circumference of the shaft, the actuator region disposed along the shaft generally beyond a grip region, a proximate portion of the actuator closest to the tip located 35 mm to 45 mm from the tip, and the actuator region having an outer diameter less than an outer diameter of the shaft located proximate to the actuator region;
    recessing the actuator button within the outer diameter of the actuator region; and
    providing a tactile boundary between the actuator button and a portion of the shaft disposed between the actuator region and the tip.

* * * * *